US012290829B2

(12) United States Patent
Ackerman et al.

(10) Patent No.: US 12,290,829 B2
(45) Date of Patent: May 6, 2025

(54) ELECTROSTATIC SPRAY DRYING NOZZLE ASSEMBLY

(71) Applicant: Spraying Systems Co., Wheaton, IL (US)

(72) Inventors: Thomas E. Ackerman, Francestown, NH (US); Lyndon John A. Wee Sit, Hudson, NH (US); Donald W. Weinstein, Nashua, NH (US); Dave C. Huffman, Merrimack, NH (US)

(73) Assignee: Spraying Systems Co., Wheaton, IL (US)

( * ) Notice: Subject to any disclaimer, the term of this patent is extended or adjusted under 35 U.S.C. 154(b) by 306 days.

(21) Appl. No.: 17/701,401

(22) Filed: Mar. 22, 2022

(65) Prior Publication Data

US 2023/0302470 A1 Sep. 28, 2023

Related U.S. Application Data

(62) Division of application No. 16/698,440, filed on Nov. 27, 2019, now Pat. No. 11,285,498.

(Continued)

(51) Int. Cl.

*B05B 5/03* (2006.01)
*B05B 5/043* (2006.01)

(Continued)

(52) U.S. Cl.

CPC ................ *B05B 5/03* (2013.01); *B05B 5/043* (2013.01); *B05B 5/10* (2013.01); *B05B 7/066* (2013.01);

(Continued)

(58) Field of Classification Search

CPC .. B05B 5/03; B05B 5/10; B05B 7/066; B05B 5/043; B05B 7/0892; B05B 15/18; B05B 7/061; B05B 5/025

(Continued)

(56) References Cited

U.S. PATENT DOCUMENTS 3,790,086 A 2/1974 Masai
4,518,120 A * 5/1985 Johnson ................ B05B 7/0892 239/549

(Continued)

FOREIGN PATENT DOCUMENTS

FR 1460927 A 12/1966

OTHER PUBLICATIONS

Machine Translation of FR-1460927-A Description, Feb. 2024, Espacenet, pp. 1-2 (Year: 2024).*

(Continued)

*Primary Examiner* — Chee-Chong Lee
*Assistant Examiner* — Kevin Edward Schwartz
(74) *Attorney, Agent, or Firm* — Leydig, Voit & Mayer, Ltd.

(57) ABSTRACT

An electrostatic sprayer operable at high flow rates and low pressures particularly suitable for spray drying. The sprayer includes an elongated body having a downstream spray nozzle assembly through which electrically charged liquid is directed via a central feed tube within the nozzle body and atomizing air is supplied via an annular passage about the liquid feed tube. In one embodiment, the nozzle assembly is an external mix cluster head spray nozzle assembly having a plurality of circumferentially spaced metallic spray tips. In another embodiment, the spray nozzle is an internal mix nozzle assembly having a spray tip with an internal mixing chamber for atomizing liquid prior to discharge.

13 Claims, 8 Drawing Sheets

Related U.S. Application Data

(60) Provisional application No. 62/773,875, filed on Nov. 30, 2018.

(51) Int. Cl.

| | |
|---|---|
| ***B05B 5/10*** | (2006.01) |
| ***B05B 7/06*** | (2006.01) |
| ***B05B 7/08*** | (2006.01) |
| ***B05B 15/18*** | (2018.01) |
| ***F26B 3/12*** | (2006.01) |

(52) U.S. Cl.
CPC .............. *B05B 7/0892* (2013.01); *F26B 3/12* (2013.01); *B05B 15/18* (2018.02)

(58) Field of Classification Search
USPC .......................................................... 239/696
See application file for complete search history.

(56) References Cited

U.S. PATENT DOCUMENTS

| | | | | |
|---|---|---|---|---|
| 4,545,536 | A | 10/1985 | Avidon | |
| 4,819,878 | A * | 4/1989 | Bailey | F26B 3/12 366/181.5 |
| 5,271,562 | A * | 12/1993 | Myers | F23J 15/003 239/290 |
| 6,276,615 | B1 * | 8/2001 | Scholz | B05B 7/0892 239/419 |
| 7,588,199 | B2 * | 9/2009 | Huffman | B05B 7/0892 239/548 |
| 10,286,411 | B2 * | 5/2019 | Ackerman | B01D 46/58 |
| 2004/0056124 | A1 * | 3/2004 | Haruch | B05B 7/10 239/690 |
| 2008/0006722 | A1 * | 1/2008 | Huffman | B05B 7/0441 239/432 |
| 2014/0110493 | A1 * | 4/2014 | Cooper | B05B 5/087 239/3 |
| 2016/0228892 | A1 * | 8/2016 | St. Peter | B05B 7/067 |
| 2017/0120267 | A1 | 5/2017 | Ackerman et al. | |
| 2017/0144120 | A1 * | 5/2017 | Bright | F26B 3/12 |
| 2018/0290160 | A1 * | 10/2018 | Haruch | B05B 7/0861 |

OTHER PUBLICATIONS

International Bureau, International Search Report in International Application No. PCT/US2019/063739, mailed Mar. 25, 2020.

* cited by examiner

ELECTROSTATIC SPRAY DRYING NOZZLE ASSEMBLY

CROSS-REFERENCE TO RELATED APPLICATION

This patent application is a divisional of U.S. patent application Ser. No. 16/698,440, filed Nov. 27, 2019, which claims the benefit of U.S. Provisional Patent Application No. 62/773,875 filed Nov. 30, 2018, both of which are incorporated by reference in their entirety.

FIELD OF THE INVENTION

The present invention relates generally to liquid spray nozzle assemblies, and more particularly, to electrostatic spray nozzle assemblies particularly adapted for spray drying liquids by electrostatically charging fluids to facilitate fine liquid particle breakdown and distribution.

BACKGROUND OF THE INVENTION

In the spray drying industry, electrostatic spray nozzle assemblies are now being used to improve drying efficiency and product quality. While it is desirable to utilize internal components made from non-metallic material, the solvents used in many spray drying applications attack and degrade such materials. Hence, it is necessary that the spray dryer apparatus be designed to ensure that solvents in their liquid state do not come in contact with such degradable plastic components. Typically electrostatic spray dryers have utilized external mix spray nozzle assemblies in which the liquid feed and atomizing gas interact outside the nozzle.

External mix spray nozzles, however, operate at very low liquid flow rates, such as less than 10 kg/hr of feed stock. Such low flow nozzles produce a very fine droplet with at an easily controllable low pressure. To increase the flow rate, however, it is necessary to increase the diameter of the liquid discharge orifice of the nozzle. As the liquid discharge orifice is increased in diameter to reach the higher flow rates, however, the droplet sizes of the spray will also increase. If the droplet size is too large, it will not dry adequately in the dryer chamber even when electrostatically charged. Liquid droplets that are not adequately dried further can coat internal components of the sprayer, impeding optimum operation and requiring cleaning and/or replacement. Larger spray nozzle discharge orifices further result in discharging sprays with greater velocities and momentum. In spray drying applications, this requires longer length and more expensive drying chambers to accommodate such discharging sprays. In order to increase spraying capacity while maintaining optimum liquid atomization at low flow rates, it has been necessary to use a multiplicity of electrostatic sprayers, with multiple nozzle bodies, feed lines, compressed gas lines, pumps, and high voltage cables, which is costly and can be cumbersome to install and use.

Internal mix spray nozzle assemblies are known that have the benefit of multistage liquid breakup in atomization which allows the spray nozzle to produce very fine liquid particle discharges. Internal mix spray nozzles, however, operate at higher liquid pressures, which can preclude the use of low pressure operating peristaltic pumps particularly preferred for spray drying in the pharma and flavor industries. Internal mix spray nozzles further utilize considerably smaller amounts of compressed atomizing gases, which can be advantageous when atomizing with non-air gases, such as hydrogen, which are desirable in various spray drying applications.

OBJECTS AND SUMMARY OF THE INVENTION

It is an object of the present invention to provide an electrostatic sprayer having an electrostatic spray nozzle assembly that can generate a controllable fine liquid droplet spray with relatively high flow rates particularly advantageous in spray drying applications.

Another object is to provide an external mix electrostatic spray nozzle assembly as characterized above that can be operated at relatively high flow rates in spray dryers having shorter and more compact drying chambers.

A further object is to provide an electrostatic spray nozzle assembly of the forgoing type in which internal degradable plastic or other non-metallic components of the spray nozzle assembly are isolated from sprayed liquid.

Yet another object is to provide an electrostatic sprayer having a spray nozzle assembly of the above kind that can be operated at relatively low pressures, and hence can economically utilize low pressure peristaltic pumps.

Still a further object is to provide an electrostatic spray nozzle assembly of the above kind that has an internal mix spray nozzle for more efficiently producing a controllable fine liquid droplets at lower atomizing gas flow rates particularly advantageous in spray drying.

Yet another object is to provide an electrostatic spray nozzle assembly for use in spray drying that is relatively simple in construction and lends itself to economical manufacture.

Other objects and advantages of the invention will become apparent upon reading the following detailed description and upon reference to the drawings, in which:

Figure 1:
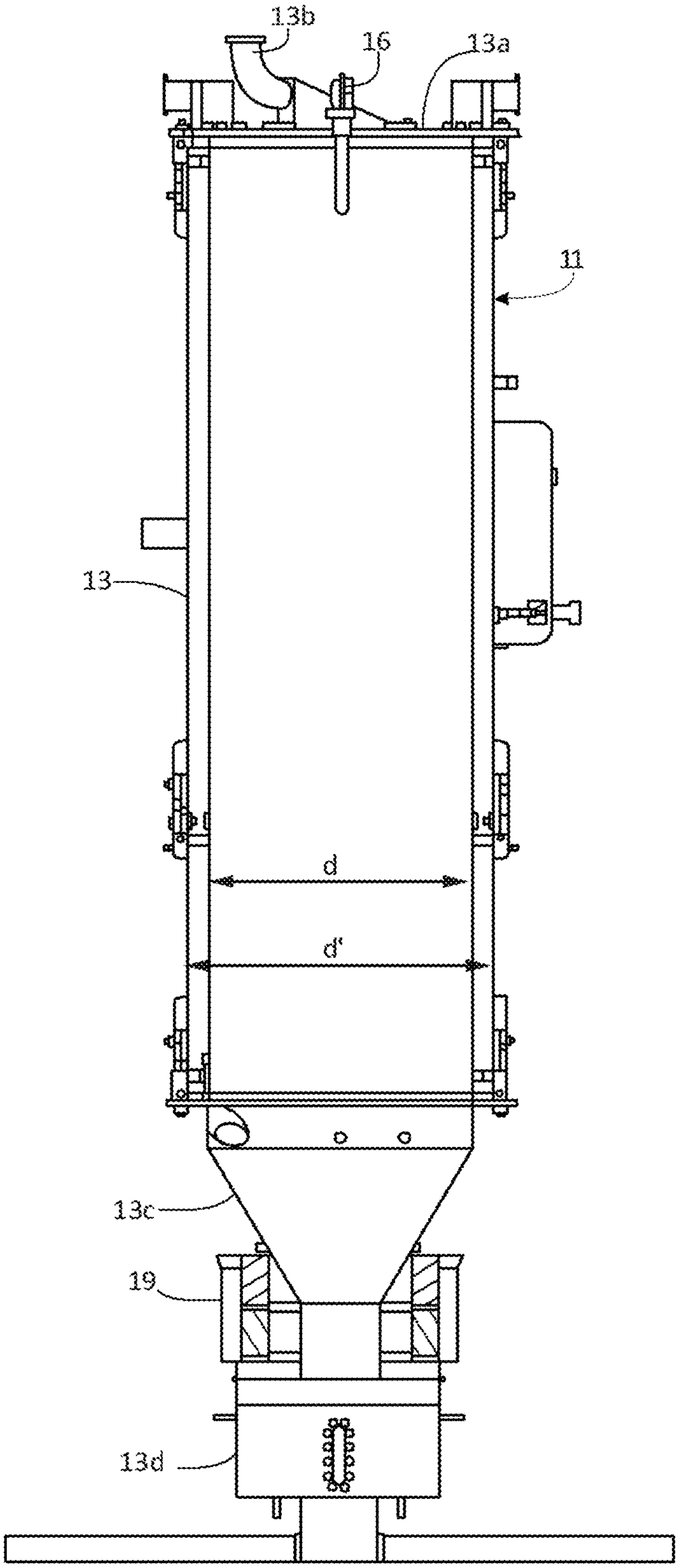
FIG. 1 is a longitudinal section of an illustrative electrostatic spray drying system.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF PREFERRED EMBODIMENTS

Figure 1A:
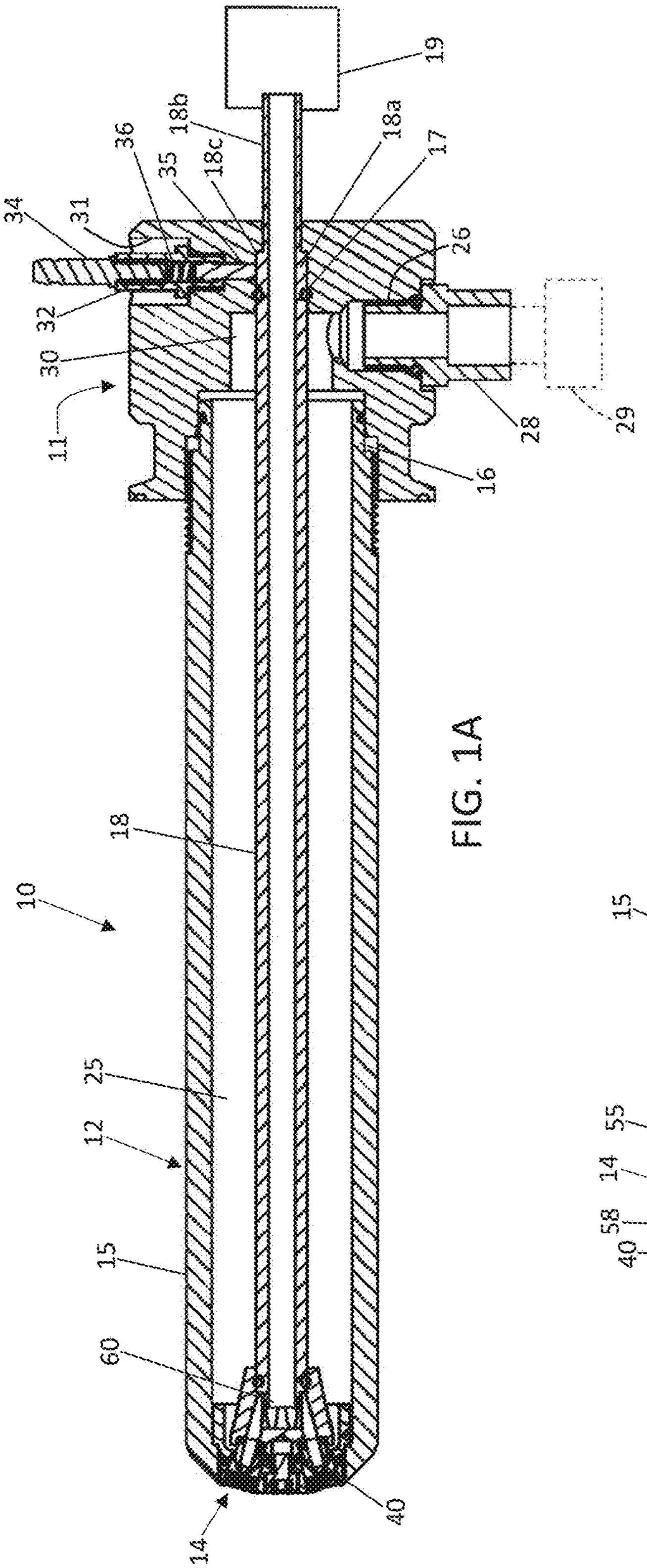
FIG. 1A is an enlarged longitudinal section of an external mix spray nozzle assembly in accordance with the invention for use in the illustrative electrostatic spray drying system.

Referring now more particularly to FIG.1A of the drawings, there is shown an illustrative electrostatic sprayer 10 in accordance with the invention. The illustrated electrostatic sprayer 10 includes a fluid and high voltage input head 11, an elongated nozzle barrel or body 12 extending downstream from the input head 11, and a discharge spray nozzle assembly 14 at a downstream end of the elongated nozzle body 12. It will be understood that the electrostatic sprayer 10 may be used in spray drying systems, such as the spray drying systems disclosed in U.S. application Ser. No. 15/342,710 filed Nov. 3, 2016 assigned to the same assignee as the present application, the disclosure of which is incorporated here by reference. Such spray drying systems, as depicted in FIG. 1, typically comprise a drying chamber 13 in the form of an upstanding cylindrical structural body; a top closure arrangement in the form of a cover or lid 13*a* for the drying chamber 13 having a heating air inlet 13*b* and an electrostatic sprayer 10 for directing electrostatically charged liquid particles into the drying chamber 13, and a bottom closure arrangement in the form of a powder direction cone 13*c* supported at the bottom of the drying chamber 13 having a heating air exhaust outlet, and a bottom powder collection chamber 13*d* for receiving the dried powder. Electrically charged liquid directed into the drying chamber 13 must be quickly and efficiently dried into powder form for collection in the powder collection chamber 13*d*.

The nozzle body 12 of the illustrated electrostatic sprayer 10 may be relatively long in length in relation to its diameter for enabling mounting of the sprayer 10 in a wall of a processing vessel or the like with the discharge spray nozzle assembly 14 within the vessel and the input head 11 remotely located outside the vessel. The input head 11 and nozzle body 12 preferably are made of a hard plastic or other electrically non-conductive material, such as thermoplastic polyetherimide (PEI) sold under the tradename Ultem1000, which can be machined into final form. In practice, the elongated nozzle body 12 may have a length of 10 times or more the diameter of the nozzle body 12, up to 12 inches or more.

The input head 11 is cylindrical in form and the elongated body 12 is a cylindrical body member 15 having an upstream end threadably engaged within a threaded bore of the input head 11 with a sealing O-ring 16 interposed between the cylindrical body member 15 and input head 11. A liquid feed tube 18 made of stainless steel or other electrically conductive material extends axially through the outer cylindrical body member 15 with an upstream end 18*a* supported within and extending outwardly thereof for coupling to pressurized liquid supply 19. The liquid feed tube 18 in this instance has a reduced diameter upstream end section 18*b* that defines a locating shoulder 18*c* mountable within a counterbore of the input head 11. A sealing O-ring 17 is interposed between the liquid feed tube 18 and the input head 11.

The liquid feed tube 18 extends axially through the cylindrical body member 45 for defining an annular atomizing gas passage 25 between a liquid feed tube 18 and the outer cylindrical body member 15. The input head 11 is formed with a radial pressurized gas inlet passage 26 that receives with a gas inlet filling 28 coupled to a suitable pressurized gas supply 29. The gas inlet passage 26 communicates with an annular gas chamber 30 surrounding the liquid feed tube 18 within the input head 11, which in turn communicates with the annular atomizing gas passage 25 through the cylindrical body member 15.

For electrically charging liquid directed into and through the liquid feed tube 18, the input head 11 further has a radial passage 31, in this case upstream of the gas inlet passage 26, that receives a fitting 32 secured to a high voltage cable 34 connected to a high voltage source. The high voltage cable 34 in this instance has a terminal abutment segment 35 biased by a spring 36 into reliable electrically conducting relation with the liquid feed tube 18. With the liquid feed tube 18 electrically charged by the high voltage cable 34 it can be seen that feed liquid through the feed tube 18 is charged along its entire length of travel to the spray nozzle assembly 14. At the same time, pressurized gas is communicated through the annular gas passage 25 between the liquid feed tube 18 and outer cylindrical body member 15.

Figure 2:
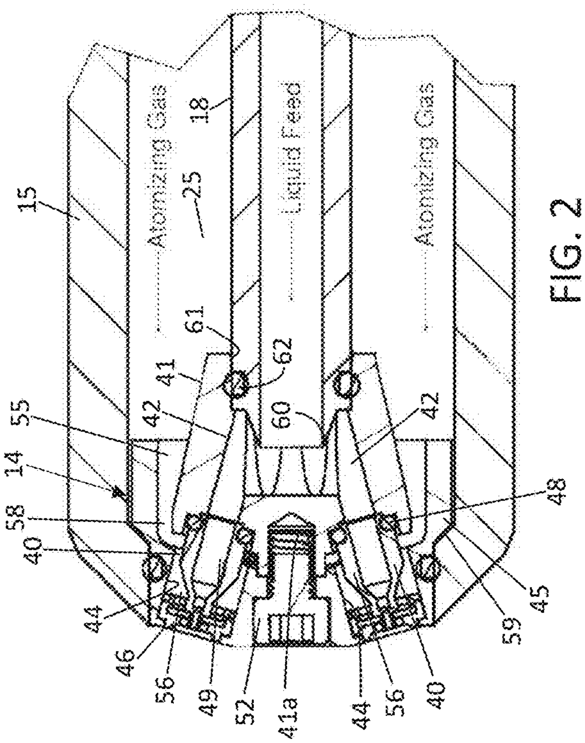
FIG. 2 is an enlarged fragmentary section of the external mix spray nozzle assembly of the electrostatic sprayer shown in FIG. 1.
Figure 3:
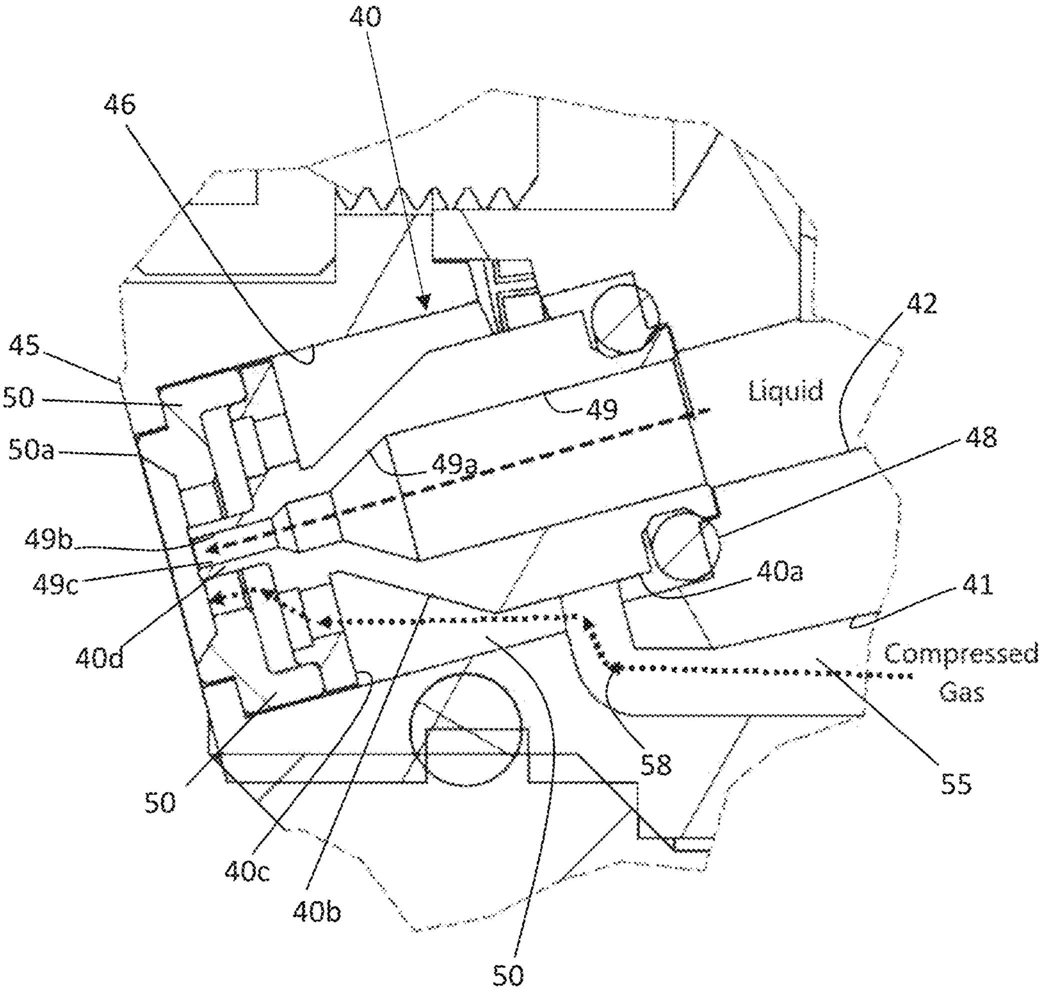
FIG. 3 is an enlarged fragmentary section of one of the spray tip assemblies of the spray nozzle assembly shown in FIG. 2.
Figure 4:
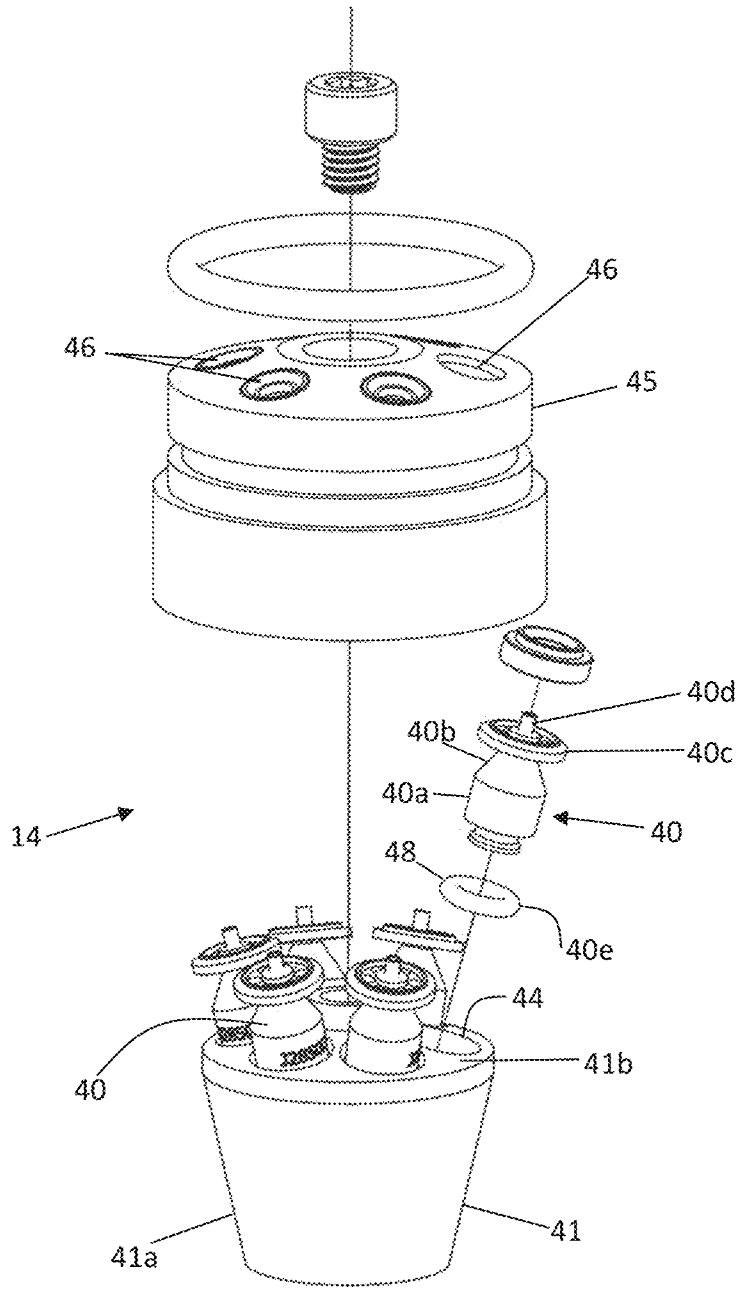
FIG. 4 is an exploded view of the spray nozzle assembly shown in FIGS. 1 and 2.

In accordance with this embodiment of the invention, the spray nozzle assembly 14 is an external mix spray nozzle assembly operable for producing a fine liquid particle spray, particularly suitable for spray drying applications, at relatively high liquid flow rates and low pressures for optimum and economical spray drying operation. To this end, the spray nozzle assembly 14 has a cluster head design comprising a plurality of individual spray tips 40 coupled to common pressurized liquid and gas supplies, in this case, from the liquid feed tube 18 and the annular pressurized gas passage 25, respectively. The illustrated cluster head spray nozzle assembly 14, as best depicted in FIGS. 2-4, has a cluster head body 39 that comprises a nozzle liquid manifold 41 and a nozzle cap 45. The nozzle liquid manifold 41 is formed with a plurality of outwardly angled liquid passages 42 each communicating between the common liquid feed tube 18 and a plurality of respective downstream spray tip receiving openings 44 within which a respective spray tip 40 is mounted and retained (FIGS. 2 and 4). The nozzle cap 45 mounted on a downstream end of the nozzle liquid manifold 41 has a plurality of circumferentially spaced cylindrical openings 46 aligned with the spray tips 40. The nozzle liquid manifold 41 in this instance has a frustoconical upstream end 41*a* expanding outwardly in a downstream direction and an outwardly curved downstream end 41*b* through which the spray tip receiving openings 44 extend in a downstream direction at a small angle, such as between about 12-15 degrees, outwardly with respect to a central axis of the nozzle liquid manifold 41 and cylindrical body member 15.

In carrying out this embodiment, the spray tips 40 each are made of an electrically conductive metal and in this case have an upstream cylindrical hub 40*a*, a inwardly tapered forwardly extending section 40*b* having an outwardly extending radial flange 40*c* adjacent a downstream end thereof, and a forwardly extending relatively small diameter nose 40*d*. (FIG. 4) The spray tips 40 each have an upstream smaller diameter annular hub 40*e* positioned in the spray tip receiving opening 44 of the nozzle liquid manifold 41 with a sealing O-ring 48 interposed therebetween (FIG. 2). The spray tips 40 each have a relatively large diameter inlet passage section 49 that communicates with an inwardly converging conical passage section 49*a*, which in turn communicates with a relatively small diameter liquid passage 49*b* extending through the nose 40*d* that defines a relatively small discharge orifice 49*c*, such as on the order of 0.040 inches. (FIG. 3) The spray tip inlet passage sections 49 of each of the spray tips communicate with respective one of the outwardly converging liquid flow passages 42 in the nozzle liquid manifold 41.

The radial flange 40*c* of each spray tip 40 is each mounted within a respective one of the cylindrical openings 46 of the nozzle cap 45 with an annular plastic air cap 50 disposed about the spray tip radial flange 40*c* in interposed sealing engagement between the radial flange 40*c* and nozzle cap opening 46. The plastic air cap 50 in this case has an L-shape cross section periphery disposed about the front and outer peripheries of each spray tip radial flange 40*c* with a forwardly extending lip 50*a* mounted in overlying relation to an annular lip of the nozzle cap opening 46. (FIG. 3) The nozzle cap 45 is secured to the nozzle liquid manifold 41 by a nylon or like non-metallic retaining screw 52 extending centrally through the nozzle cap 45 into threaded engagement with an axial opening 41*a* of the nozzle liquid manifold 41 for securing the spray tips 40 and plastic air caps 50 in assembled relation.

For atomizing liquid discharging from the spray tips 40, the nozzle liquid manifold 41 and nozzle cap 45 define an annular atomizing gas passageway 55 (FIG. 2) that communicates between the annular gas passageway 25 between the metallic liquid feed tube 18 and outer nozzle body member 15 and an annular gas passage 56 about each spray tip 40 via a respective right angle inlet passage 58. Pressurized atomizing gas thereby can be simultaneously directed about the plurality of spray tips 40, through circumferential air passage openings 40*d* in the respective spray tip radial flanges 40*c*, and axially outwardly into interacting atomizing engagement with liquid discharging from the plurality of spray tip discharge orifices 49*c*. (FIG. 3)

In carrying a further feature of this embodiment, liquid directed through the cluster head spray nozzle assembly 14 is subjected to multistage electrostatic charging for enhanced liquid atomization upon discharge from the spray nozzle assembly. To this end, a downstream end of the metallic electrically charged liquid feed tube 18 has a sharp chamfered end 60, preferably charged to about 30 kv, that first focuses an electrostatic field into the feed stock as it is discharged from the feed tube 18 and prior to entry into the spray tips 40, and secondly, the gap between the sharp chamfered end 60 of the charged liquid feed tube 18 and the spray tips 40 creates a capacitance within the gap that has unexpectedly been found to increase the electrostatic charge on the liquid as it is directed to and through the spray tips 40.

In operation, the cluster head spray nozzle assembly 14 has proven to produce quality fine liquid particle spraying optimum for spray drying applications at relatively high liquid flow rates up to 125 kg/hr. Yet the spray tips 40 each have relatively small discharge orifices 49*c* for enabling low pressure, controllable operation, using peristaltic pumps favored in spray drying applications. The cluster head spray nozzle assembly 14, furthermore, can deliver such high flow rate spraying in much shorter length, such as three to five feet, and hence, in more economical spray drying chambers then hereto for possible when utilizing spray nozzle with larger discharge orifices and liquid pressures to increase flow rate. The multiple electrostatically charged spray patterns discharging from the cluster head spray nozzle assembly in the same chamber further has been found to cause particles to reattach to one another after they have dried, thereby reducing the amount of particles that are too fine to control which can hinder coating efficiency. Finally, it can be seen that all of the internal components of the electrostatic sprayer that are subject to contact by the liquid being sprayed are made of Teflon or stainless steel which are resistant to most liquids to be sprayed. The outer cylindrical body member 15, which preferably is made of a harder polyetherimide material that can be subject to degradation from certain solvents used in spray drying, is maintained out of contact from the liquid feed stock.

Figure 5:
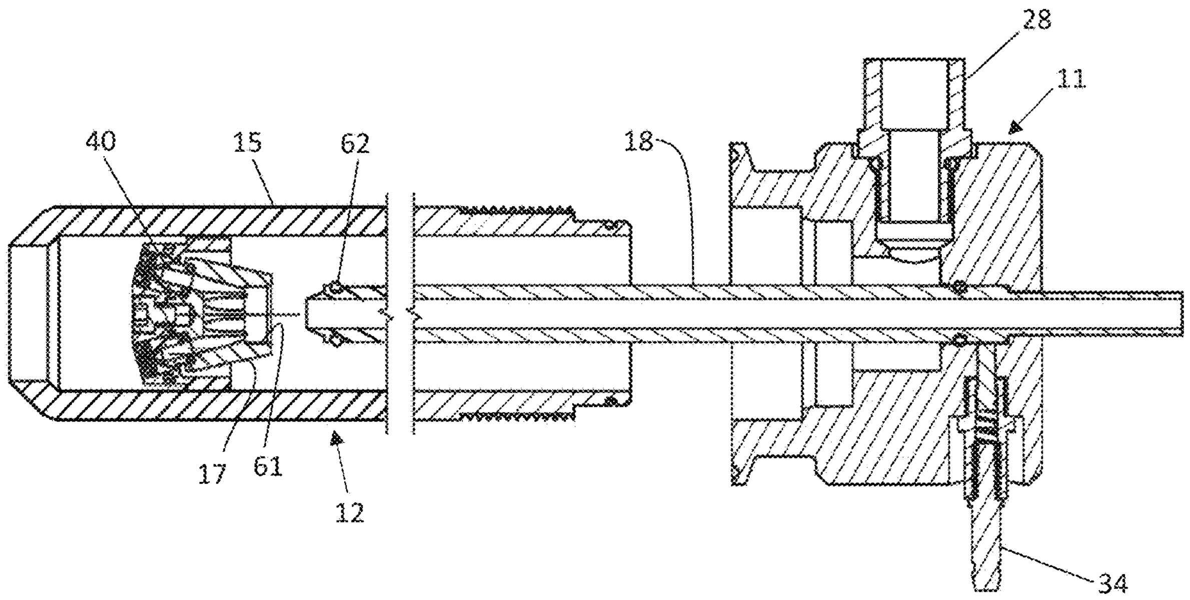
FIG. 5 is a longitudinal section depicting the assembly of the spray nozzle assembly in the electrostatic sprayer shown in FIG. 1.
Figure 6:
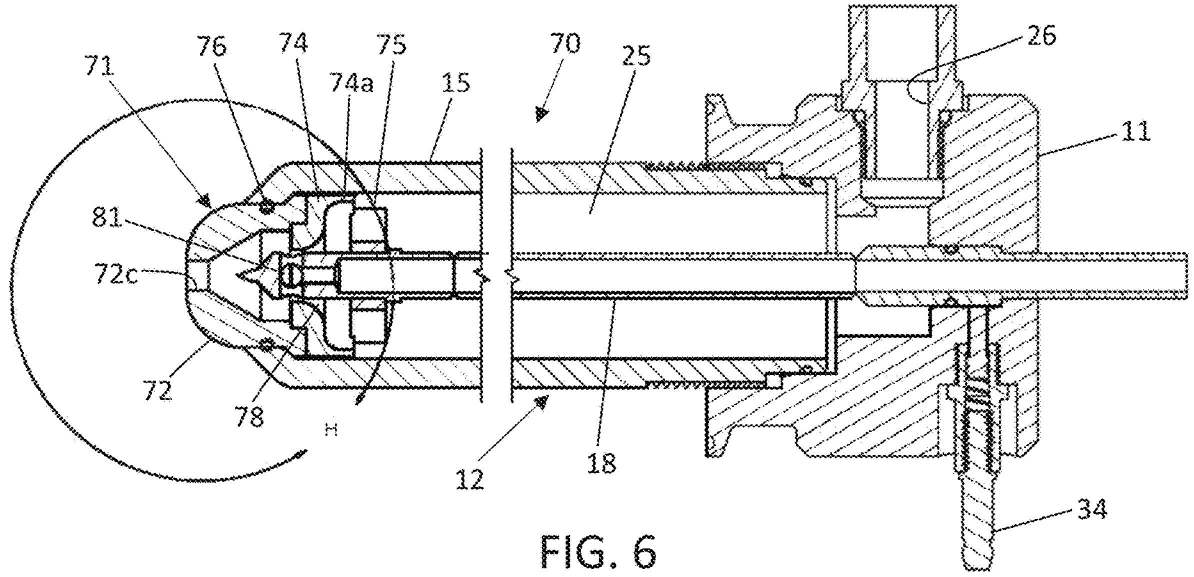
FIG. 6 is a longitudinal section of another embodiment of an electrostatic sprayer in accordance with the invention, in this case having an internal mix spray nozzle assembly.
Figure 7:
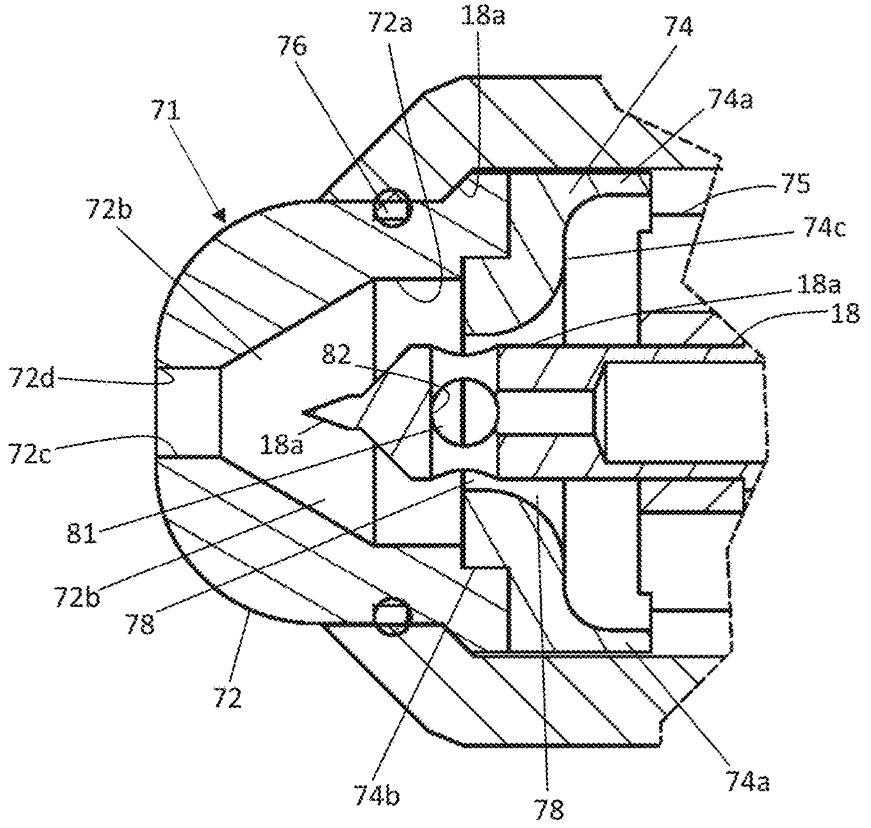
FIG. 7 is an enlarged fragmentary section of the spray nozzle assembly of the sprayer shown in FIG. 6.
Figure 8:
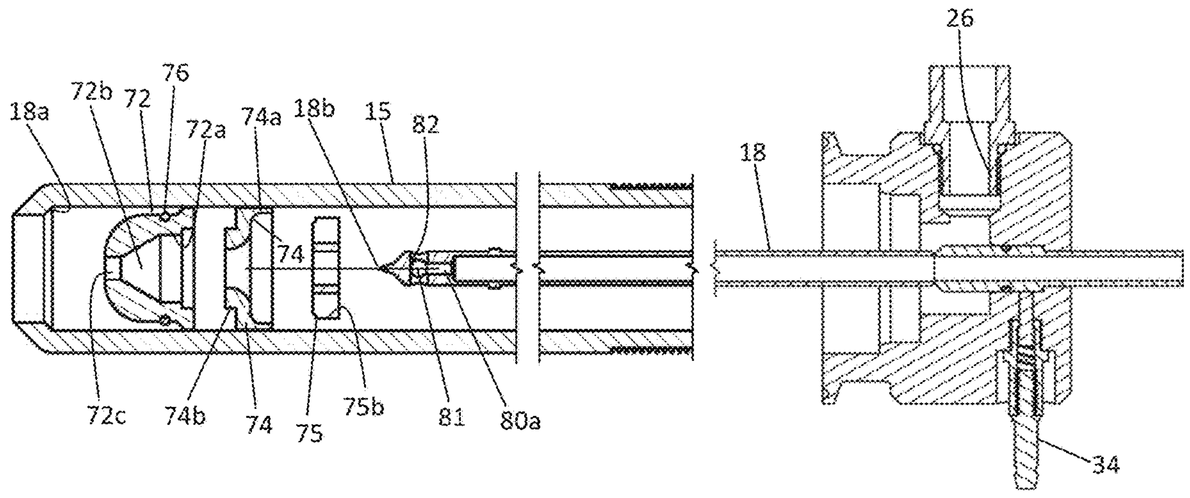
FIG. 8 is a longitudinal section similar to FIG. 6, but showing components of the sprayer being assembled.
Figure 9:
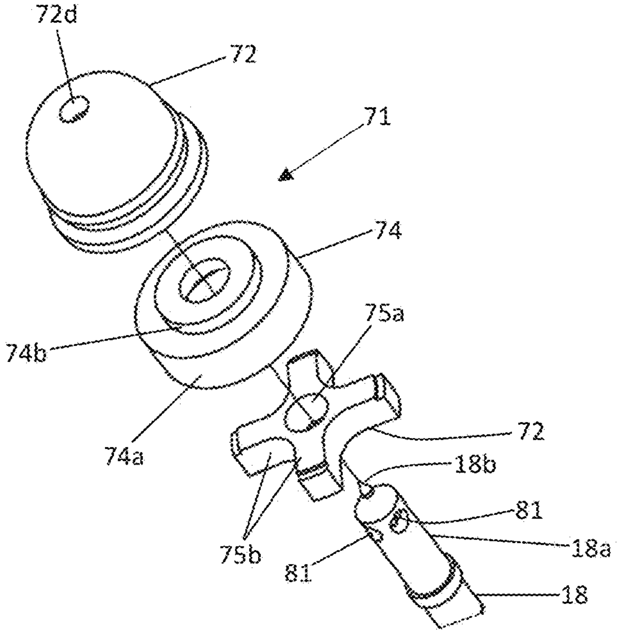
FIG. 9 is an exploded view of the internal mix spray nozzle assembly of the electrostatic sprayer shown in FIG. 6.
Figure 10:
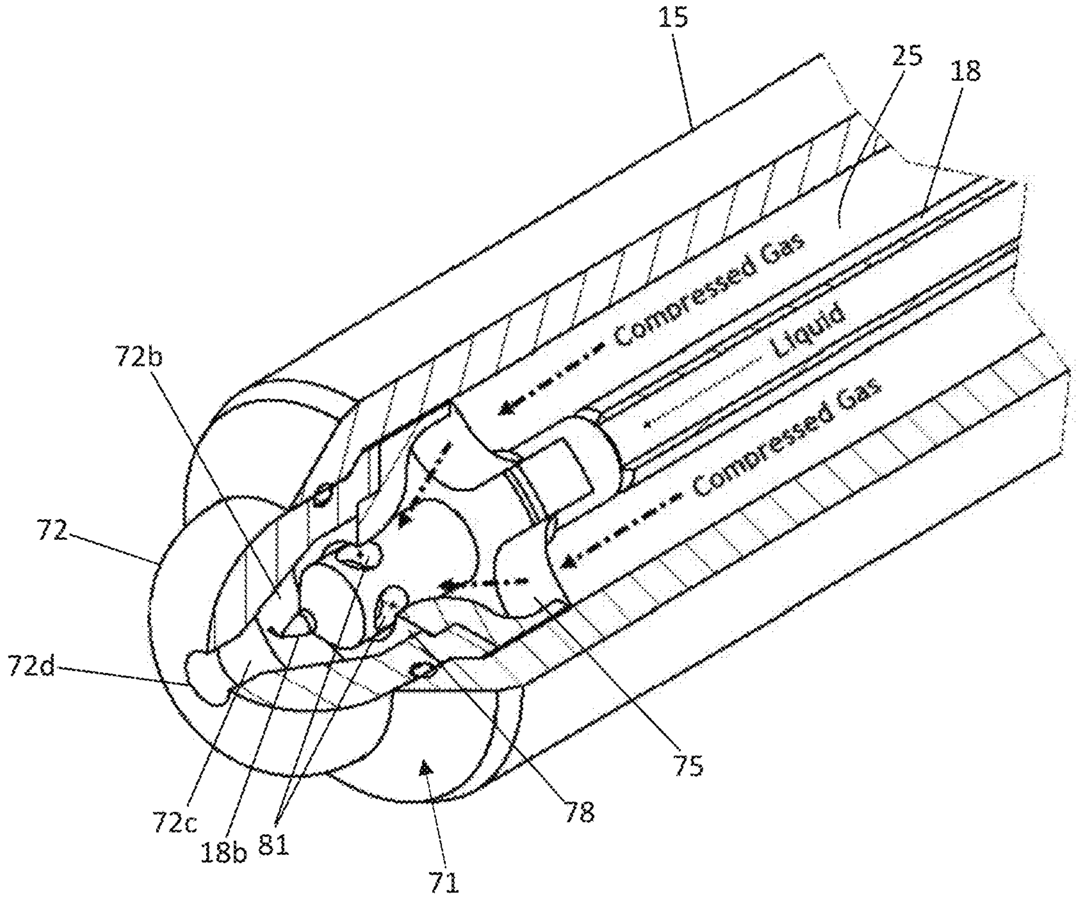
FIG. 10 is an enlarged fragmentary perspective, partially in section, showing the discharge end of the electrostatic sprayer shown in FIG. 6.

To facilitate economical manufacture of the electrostatic sprayer 10, it will be appreciated that the cluster head spray nozzle assembly 14 may be preassembled for efficient mounting in the nozzle body 12. The spray nozzle assembly 14 in preassembled condition in this instance can be assembled in cylindrical body member 15 by positioning into the cylindrical body member 15 from an upstream end, as depicted in FIG. 5. The downstream end of the illustrated cylindrical body member 15 is formed with an annular smaller diameter lip 59 for supporting the other periphery of the nozzle cap 45 with a sealing O-ring 63 between the nozzle cap 45 and cylindrical body member 15. The liquid feed tube 18 can thereupon be inserted into a central opening 61 of the nozzle liquid manifold 41 with an interposed annular O-ring 62 therebetween. While the illustrated spray nozzle assembly 14 has six spray tips, depending upon the size of the nozzle liquid manifold, other numbers of spray tips, preferably between about three and eight, could be used.

Referring now more particularly to FIGS. 6-10, there is shown an electrostatic sprayer 70 having an alternative embodiment of an electrostatic spray nozzle assembly 71 wherein items similar to those described above have been given similar reference numerals. The electrostatic sprayer 70 includes an input head 11 with liquid feed tube 18, a pressurized gas inlet 26, and high voltage cable connection 34 similar to that described above. The sprayer 70 further includes an elongated nozzle body 12 fixed to the input head 11 with the electrically chargeable liquid feed tube 18 centrally disposed therein.

In carrying out this embodiment, the electrostatic spray nozzle assembly 71 is an internal mix spray nozzle assembly operable for directing a fine liquid particle spray for optimum usage in spray drying. The illustrated spray nozzle assembly 71 basically comprises a dome configured spray tip 72, an inner air guide 74 mounted directly upstream of the spray tip 72, and a center locator 75 for supporting the downstream end of the liquid feed tube 18 centrally within the air guide 74 and spray tip 72.

The illustrated dome configured spray tip 72 has an upstream cylindrical passage section 72*a* that communicates with an inwardly converging mixing chamber 72*b*, which in turn communicates through a smaller diameter cylindrical passage section 72*c* that defines a spray discharge orifice 72*d*. The spray tip 72 has an outwardly extending radial flange 72*c* supported against a reduced diameter annular retention lip 18*a* of the outer cylindrical nozzle body member 18. A sealing O-ring 76 is interposed between the dome of the spray tip 72 and an inner annular side of retaining lip 18*a* of the cylindrical body member 15.

The air guide 74 has an outer cylindrical wall section 74*a* mounted within the cylindrical body member 15 and a forwardly extending annular hub 74*b* concentrically mounted within an annular counterbore of the spray tip 72. The center locator 75 has a central opening 75*a* in which a liquid feed tube 15 extends and is supported in a plurality of radial support legs 75*b*. The radial legs 75*b* in this case are supported adjacent their downstream ends within the cylindrical wall 74*a* of the air guide 74. The air guide 74 has an inwardly curved internal wall 74*c* for channeling and converging pressurized atomizing gas from the annular gas passage 25 through a small annular gas passage 78 surrounding the liquid feed tube 18.

In further carrying out this embodiment, the liquid feed tube 18 includes an end segment section 18*a* axially coupled thereto formed with a reduced diameter liquid passage section 80*a* that communicates with a plurality of cross slots 81 for directing pressurized liquid flow streams radially outwardly of the liquid feed tube 18 for interaction and atomization by pressurized atomizing gas directed through the narrow annular air passage 78 directly across the cross slots 81. In this instance there are four circumferentially spaced cross slots 81 which define an impingement surface 82 at the end of the feed tube segment 18*a* against which liquid directed through the liquid feed tube 18 impinges and is forcefully directed out radially outwardly for interaction with the pressurized atomizing gas. It will be understood that the extension segment 18*a* of the liquid feed tube 18 also is made of an electrically conductive metallic material and is fixed in electrically contacting relation to the liquid feed tube 18.

In keeping with a further important feature of this embodiment, the liquid feed tube end segment 18*a* has a sharp pointed end 18*b* disposed within the mixing chamber 72*b* of the spray tip 72 for focusing an electrostatic field therefrom in a manner that enhances electrostatic charging and atomization of the liquid particles within the spray tip mixing chamber 72*b* prior to discharge from the spray nozzle assembly 71. The terminal pointed end 18*b* of the feed tube 18 is located centrally within the spray tip mixing chamber 72*b* for focusing the electrostatic field into the atomized liquid particles as they converge and exit the discharge passage 72*d*.

In operation, the electrostatic sprayer 70 is operable for efficiently producing quality fine liquid particle atomized spray at high liquid feed stock rates up to 125 kg/hr with less pressurized atomizing gas requirements, which is particularly advantageous when using non-air atomizing gas, such as hydrogen gas commonly used in spray drying. Nitrogen is used to protect against a dust explosion, which is a higher risk with electrostatic spraying, also has the ability to absorb large amounts of moisture. Like in the previous embodiment, liquid is charged as it is directed through the metal liquid supply tube 18 simultaneous with the direction of pressurized gas through the annular chamber 25 surrounding the liquid supply tube 18. In this instance, the liquid breaks up in multiple stages, first by impinging upon the impingement surface 82 at the downstream end of the liquid supply tube segment 18*a* and transverse direction through the radial discharge passages 81 for interaction with pressurized atomizing gas directed across radial liquid discharge passages 81. The atomized liquid is then directed by the atomizing gas into the downstream mixing chamber 72*b* of the spray tip 72 where fine liquid particles are further charged by the focused electrostatic fields promulgated by the sharp pointed end 18*b* liquid feed tube segment 18*a* for further enhanced atomization prior to discharge from the exit orifice 72*d* as a very fine liquid particle spray for efficient spray drying.

The invention claimed is:

1. An electrostatic spray drying system for drying liquid into powder comprising:

an elongated body having closure arrangements at opposite ends for forming a drying chamber within said elongated body:

a drying gas inlet supported by said elongated body for coupling to a drying gas source for directing drying gas into said drying chamber;

an external mix electrostatic spray dryer supported by said elongated body for directing liquid into the drying chamber to be dried into powder;

said external mix electrostatic spray dryer having an input head;

an elongated nozzle body supported in downstream relation to said input head;

a liquid feed tube made of electrically conductive material disposed within said nozzle body and extending in downstream relation to said input head; said liquid feed tube being connectable to a pressurized liquid supply for directing liquid through said feed tube;

said nozzle body and liquid feed tube defining an annular atomizing gas passage within said nozzle body;

said input head having a cable input section in electrical contact with said liquid feed tube and for connection to an electrical source for electrically charging said liquid feed tube and liquid directed through said feed tube;

said input head having a pressurized gas inlet in communication with said annular atomizing gas passage and for connection to a pressurized atomizing gas supply for directing pressurized atomizing gas through said annular atomizing gas passage;

an external mix cluster head spray nozzle assembly mounted at a downstream end of said elongated nozzle body;

said external mix cluster head spray nozzle assembly including a cluster head body comprising a liquid manifold and an air cap;

said liquid manifold having a plurality of circumferentially spaced liquid passages each communicating with said liquid feed tube for receiving electrically charged liquid from said liquid feed tube;

a plurality of circumferentially spaced spray tips each removably mounted in a respective opening of said liquid manifold in communication with a respective liquid passage of said liquid manifold;

said spray tips each being made of electrically conductive material and having a liquid flow passage with an upstream end for receiving electrically charged liquid directed through said liquid feed tube and a respective one of said liquid passages for discharge from a discharge orifice of said spray tip as an electrically charged liquid spray;

said air cap defining an air passage about each spray tip that communicates with said annular atomizing gas passage for directing atomizing gas about each discharge orifice for atomizing the electrically charged liquid discharging from each spray tip external to said cluster head body for facilitating drying of the electrically charged atomized liquid into powder form within the drying chamber.

2. The electrostatic spray drying system of claim 1 in which said elongated nozzle body and said cluster head body are made of a non-electrically conductive material.

3. The electrostatic spray drying system of claim 1 in which said spray tips are disposed in downstream spaced relation to said electrically charged liquid feed tube such that an electrical capacitance is formed between said electrically charged liquid feed tube and each spray tip that enhances electrostatic charging of liquid directed to said spray tips.

4. The electrostatic spray drying system of claim 1 in which said spray tips are oriented in a downstream direction outwardly with respect to a central axis of the cluster head body.

5. The electrostatic spray drying system of claim 1 in which said air cap is disposed in surrounding relation to a downstream end of said liquid manifold, said liquid manifold being formed with a plurality of outwardly angled circumferentially spaced liquid passages, said air cap being formed with a plurality of circumferentially spaced openings each disposed in surrounding relation to a respective one of the spray tips and communicating with said annular atomizing gas passage for directing atomizing gas from said annular atomizing gas passage about each respective spray tip for atomizing liquid discharging from the spray tip.

6. The electrostatic spray drying system of claim 5 in which said liquid manifold has a frustoconical shape expanding outwardly in a downstream direction.

7. The electrostatic spray drying system of claim 1 in which said elongated nozzle body is formed with a downstream inwardly annular directed lip, and said cluster head body is mounted within said elongated nozzle body in engaging relation to said annular lip.

8. The electrostatic spray drying system of claim 1 including a peristaltic pump for directing liquid from a liquid supply through said electrically charged liquid feed tube.

9. The electrostatic spray drying system of claim 1 that is operable for drying discharging liquid spray within three to five feet of discharge.

10. The electrostatic spray drying system of claim 1 in which said spray tips each are operable for discharging an electrically charged liquid spray at flow rates up to 125 kg/hr.

11. An electrostatic spray drying system comprising:

an external mix electrostatic sprayer for directing liquid to be dried;

said external mix electrostatic sprayer having an input head;

an elongated nozzle body supported in downstream relation to said input head;

a liquid feed tube made of electrically conductive material disposed within said nozzle body and extending in downstream relation to said input head; said liquid feed tube being connectable to a pressurized liquid supply for directing liquid through said feed tube;

said nozzle body and liquid feed tube defining an annular atomizing gas passage within said nozzle body;

said input head having a cable input section in electrical contact with said liquid feed tube and for connection to an electrical source for electrically charging said liquid feed tube and liquid directed through said feed tube;

said input head having a pressurized gas inlet in communication with said annular atomizing gas passage and for connection to a pressurized atomizing gas supply for directing pressurized atomizing gas through said annular atomizing gas passage;

an external mix cluster head spray nozzle assembly mounted at a downstream end of said elongated nozzle body;

said external mix cluster head spray nozzle assembly including a cluster head body comprising a liquid manifold and an air cap;

said liquid manifold having a plurality of circumferentially spaced liquid passages each communicating with said liquid feed tube for receiving electrically charged liquid from said liquid feed tube;

a plurality of circumferentially spaced spray tips each removably mounted in a respective opening of said liquid manifold in communication with a respective liquid passage of said liquid manifold;

said spray tips each being made of electrically conductive material and having a liquid flow passage with an upstream end for receiving electrically charged liquid directed through said liquid feed tube and a respective one of said liquid passages for discharge from a discharge orifice of said spray tip as an electrically charged liquid spray;

said air cap defining an air passage about each spray tip that communicates with said annular atomizing gas passage for directing atomizing gas about each discharge orifice for atomizing the electrically charged liquid discharging from each spray tip external to said cluster head body; and said spray tips each having an outwardly extending radial flange formed with gas passageways for supporting the spray tip in a respective area of the circumferentially spaced openings while permitting the flow of atomizing gas through the radial flange for atomizing liquid discharging from the spray tip.

12. The electrostatic spray drying system of claim 1 in which said spray tips each have a cylindrical hub, an inwardly tapered forward section, and a relatively smaller diameter forward nose that defines the discharge orifice.

13. The electrostatic spray drying system of claim 1 including a non-metallic sealing cap interposed between the radial flange of each spray tip and the air cap opening within which the spray tip is mounted.

* * * * *